(12) United States Patent
Murphy et al.

(10) Patent No.: US 7,860,129 B2
(45) Date of Patent: Dec. 28, 2010

(54) DEVICE, SYSTEM AND METHOD FOR DATA TRANSFER OPTIMIZATION

(75) Inventors: Kevin Murphy, Chandler, AZ (US); Tair Shapiro, Jerusalem (IL); Michael Stahl, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 17 days.

(21) Appl. No.: 12/486,128

(22) Filed: Jun. 17, 2009

(65) Prior Publication Data

US 2009/0252180 A1 Oct. 8, 2009

Related U.S. Application Data

(63) Continuation of application No. 10/673,924, filed on Sep. 30, 2003, now Pat. No. 7,567,559.

(51) Int. Cl.
*H04L 12/28* (2006.01)
*H04L 12/56* (2006.01)
*H04J 3/24* (2006.01)
*H04J 3/16* (2006.01)
*H04J 3/22* (2006.01)
*H04N 7/173* (2006.01)

(52) U.S. Cl. ............... 370/474; 370/389; 370/392; 370/471; 370/476; 725/111

(58) Field of Classification Search ........... 370/389
See application file for complete search history.

(56) References Cited

U.S. PATENT DOCUMENTS

| | | | |
|---|---|---|---|
| 2002/0067721 A1* | 6/2002 | Kye | 370/389 |
| 2002/0073227 A1* | 6/2002 | Bunn et al. | 709/236 |
| 2002/0122395 A1* | 9/2002 | Bourlas et al. | 370/329 |
| 2003/0014764 A1* | 1/2003 | Saladino et al. | 725/111 |
| 2004/0264468 A1* | 12/2004 | Horton et al. | 370/392 |
| 2005/0030944 A1* | 2/2005 | Lazarus et al. | 370/389 |

OTHER PUBLICATIONS

PacketCable Dynamic Quality-of-Service Specification, Aug. 15, 2003, Cable Television Labratories, Inc.*

* cited by examiner

*Primary Examiner*—William Trost, IV
*Assistant Examiner*—Andrew Chriss
(74) *Attorney, Agent, or Firm*—Pearl Cohen Zedek Latzer, LLP

(57) ABSTRACT

Devices, systems and methods for data transfer optimization. A computing platform may, for example, modify a first property of a communication network in relation to an analysis of a second property of said communication network and a property of a data item. For example, a processor or a modem may dynamically modify a payload header suppression module to suppress a static portion of a data packet or an acknowledgment packet.

20 Claims, 2 Drawing Sheets

DEVICE, SYSTEM AND METHOD FOR DATA TRANSFER OPTIMIZATION

PRIOR APPLICATION DATA

The present application is a continuation of prior U.S. patent application Ser. No. 10/673,924 filed Sep. 30, 2003, now U.S. Pat. No. 7,567,559 entitled "DEVICE, SYSTEM AND METHOD FOR DATA TRANSFER OPTIMIZATION", incorporated by reference herein in its entirety.

BACKGROUND OF THE INVENTION

In the field of wired and wireless communication, computer platforms may send and receive data. In order to improve and increase the data transfer rate, for example, between a Cable Modem (CM) and a Cable Modem Termination System (CMTS), a Payload Header Suppression (PHS) rule may be applied. In accordance with some versions of Data Over Cable Service Interface Specification (DOCSIS®) (e.g., version 1.0 which was ratified by the International Telecommunication Union in March 1998, version 1.1 which was issued by CableLabs® in April 1999, version 2.0 which was announced by CableLabs® in January 2002, and other suitable versions), the PHS rule may suppress a repetitive portion of a packet, thus increasing data transfer rate. However, in some implementations, the PHS rule may only be defined during an initial registration process or when a new connection or service flow is set between a CM and a CMTS. Thus, in some cases, the current use of the PHS rule may be limited to data traffic whose characteristics are known in advance, e.g., to data traffic whose, for example, protocol type, source Internet Protocol (IP) address, destination IP address, source port, and/or destination port, are known in advance.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
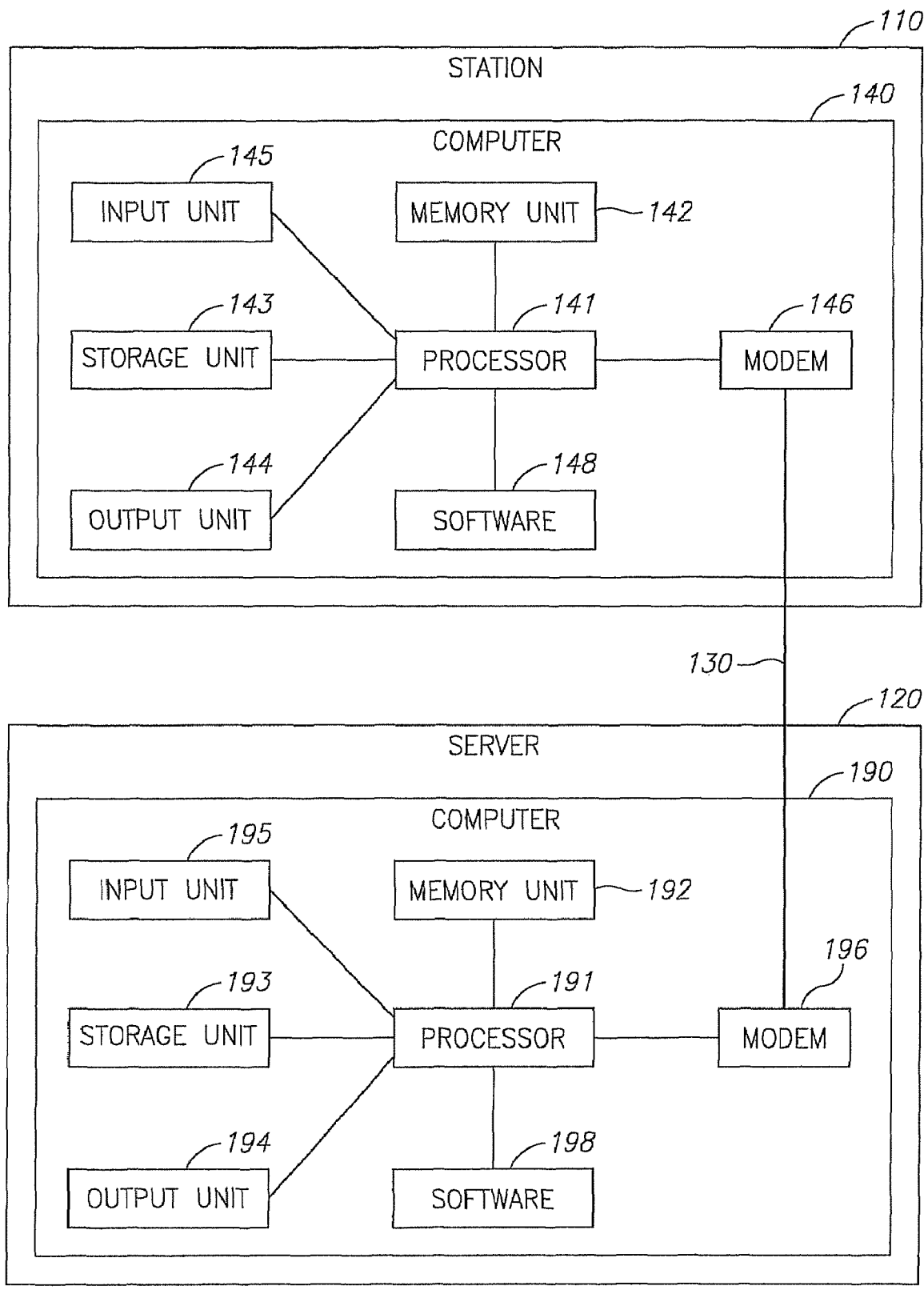
FIG. 1 is a schematic illustration of a network in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

It should be noted that for purposes of simplicity, a portion of the discussion is presented in relation to a CM and/or a CMTS. However, the present invention is not limited in this regard, and embodiments of the present invention may be used in conjunction with various other applications, apparatuses and/or systems.

FIG. 1 schematically illustrates a network 100 in accordance with some embodiments of the invention. Network 100 may include, for example, a station 110, a server 120, and a link 130. In some embodiments, network 100 may include other and/or additional suitable components, for example, a plurality of stations which may be (but need not be) similar to station 110, a plurality of servers which may be (but need not be) similar to server 120, and/or a plurality of links which may be (but need not be) similar to link 130.

Station 110 may be, for example, a computing platform or a computing device. For example, station 110 may be or may include a personal computer, a desktop computer, a mobile computer, a laptop computer, a notebook computer, a terminal, a workstation, a server computer, a Personal Digital Assistant (PDA) device, a tablet computer, a network device, a CM, a "set-top box", or other suitable device. Station 110 may be implemented using any suitable combination of hardware components and/or software components.

In the example shown in FIG. 1, station 110 may include a computer 140, which may include, for example, a processor 141, a memory unit 142, a storage unit 143, an output unit 144, an input unit 145, a modem 146, and software 148. Station 110 may include other suitable components or sets of components, and may be implemented using any suitable combination of hardware components and/or software components.

Processor 141 may include, for example, a Central Processing Unit (CPU), a Digital Signal Processor (DSP), one or more controllers, or any suitable specific and/or general and/or multi-purpose processor or micro-processor or controller. Memory unit 142 may include, for example, a Random Access Memory (RAM), a Dynamic RAM (DRAM), or other suitable memories. Storage unit 143 may include, for example, a hard disk drive, a floppy disk drive, a Compact Disk (CD) drive, or other suitable removable and/or fixed storage unit. Output unit 144 may include, for example, a monitor. Input unit 145 may include, for example, a keyboard, a mouse, or a touch-pad. It is noted that processor 141, memory 142, storage unit 143, output unit 144 and/or input unit 145 may include other suitable components and/or implementations as is known in the art.

In one embodiment, modem 146 may include, for example, a CM, or station 110 itself may be a CM or other suitable modem or communications device. In alternate embodiments, modem 146 may include a wireless modem, and may optionally include an internal and/or external antenna, which may include a dipole Radio Frequency (RF) antenna or other suitable antenna. In some embodiments, modem 146 may be internal or external to computer 140, and may be implemented, for example, using an external peripheral accessory unit, a set-top box or a cable box, an accessory card, a 10BASE-T Ethernet card, a 100BASE-T Ethernet card, a 10/100BASE-T Ethernet card, or various other suitable internal and/or external implementations. Modem 146 may include other suitable components and/or implementations as is known in the art.

Software 148 may include, for example, one or more operating systems (e.g., Microsoft Windows, Linux, Unix, Apple OS, Solaris, Sun-OS, HP-UX, or other suitable operating systems), one or more software applications, one or more drivers, and/or various other suitable software components.

In some embodiments, server 120 may be or may include, for example, a suitable CMTS, a CM head-end, or other suitable component that may exchange digital signals with station 110 or with a CM network. In some embodiments, server 120 may include, for example, a modem (which may be, but need not be, similar to modem 146) or a wireless modem. In some embodiments, server 120 may include, for example, a personal computer, a desktop computer, a mobile computer, a laptop computer, a notebook computer, a terminal, a workstation, a server computer, a Personal Digital Assistant (PDA) device, a tablet computer, a network device, a router, a switch, a hub, an access point, a "set-top box", or other suitable device. Server 120 may be implemented using any suitable combination of hardware components and/or software components. In one embodiment, station 110 and server 120 may be or may include substantially the same components, and may be considered peers. While two units are shown in FIG. 1, more than two communications devices may communicate using embodiments of the invention.

In the example shown in FIG. 1, server 120 may include a computer 190, which may include, for example, a processor 191, a memory unit 192, a storage unit 193, an output unit 194, an input unit 1945, a modem 196, and software 198. Server 120 may include other suitable components or sets of components, and may be implemented using any suitable combination of hardware components and software components.

Processor 191 may include, for example, a CPU, a DSP, one or more controllers, or any suitable specific and/or general and/or multi-purpose processor or micro-processor or controller. Memory unit 192 may include, for example, a RAM, a DRAM, or other suitable memories. Storage unit 193 may include, for example, a hard disk drive, a floppy disk drive, a CD drive, or other suitable removable and/or fixed storage unit. Output unit 194 may include, for example, a monitor. Input unit 195 may include, for example, a keyboard, a mouse, or a touch-pad. It is noted that processor 191, memory 192, storage unit 193, output unit 194 and/or input unit 195 may include other suitable components and/or implementations as is known in the art.

In one embodiment, modem 196 may include, for example, a CMTS, or server 120 itself may be a CMTS or another suitable modem or communications device. In alternate embodiments, modem 196 may include a wireless modem, and may optionally include an internal and/or external antenna, which may include a dipole RF antenna or other suitable antenna. In some embodiments, modem 196 may be internal or external to computer 190, and may be implemented, for example, using an external peripheral accessory unit, a set-top box or a cable box, an accessory card, a 10BASE-T Ethernet card, a 100BASE-T Ethernet card, a 10/100BASE-T Ethernet card, or various other suitable internal and/or external implementations. Modem 196 may include other suitable components and/or implementations as is known in the art.

Software 198 may include, for example, one or more operating systems (e.g., Microsoft Windows, Linux, Unix, Apple OS, Solaris, Sun-OS, HP-UX, or other suitable operating systems), one or more software applications, one or more drivers, and/or various other suitable software components.

Link 130 may include one or more wired and/or wireless connections, which may allow exchange of data and/or signals between station 110 and server 120 and/or vice versa. In some embodiments, link 130 may include, for example, a coaxial cable, a twisted pair copper wire, an optical fiber, a wire, a cable, an optical cable, a telephone line, or any other suitable analog, digital and/or optical connection. In some embodiments, link 130 may include a wireless link between station 110 and server 120 or vice versa. It is noted that link 130 may include a single link or a plurality of links, which may be connected in series and/or in parallel; intermediate links or equipment may be included. In some embodiments, link 130 may include one or more suitable connectors, routers, switches, switch boxes, routing boxes, repeaters, amplifiers, and/or other suitable components.

In accordance with embodiments of the invention, station 110 may be or may not be in proximity to server 120, or vice versa. In one embodiment, station 110 may be physically in a short distance (e.g., three meters) from server 120. In alternate embodiments, station 110 may be located a long distance (e.g., 500 meters or more) from server 120. In some embodiments, for example, station 110 may be located in a home or an office of a user (e.g., an Internet user), and server 120 may be located at an office (e.g., a central office or a local office) of an Internet Service Provider (ISP), a dial-up ISP, a broadband ISP, a provider of Internet and/or data services via CM, a provider of Internet and/or data services via Digital Subscriber Line (DSL), a provider of Internet and/or data services via Integrated Services Digital Network (ISDN), a provider of Internet and/or data services via telephone lines, a local loop provider or company, a Multiple Systems Operator (MSO), or the like.

It is noted that station 110, server 120 and/or link 130 may include various other components, and/or may be configured with additional and/or alternative units. Further, station 110, server 120 and/or link 130 may be implemented using any suitable combination of hardware and/or software, and may include any suitable circuit, circuitry, controller, gate, buffer, memory, unit or combination of integrated and/or separate units or circuits, as is known in the art, to perform desired functionalities.

Figure 2:
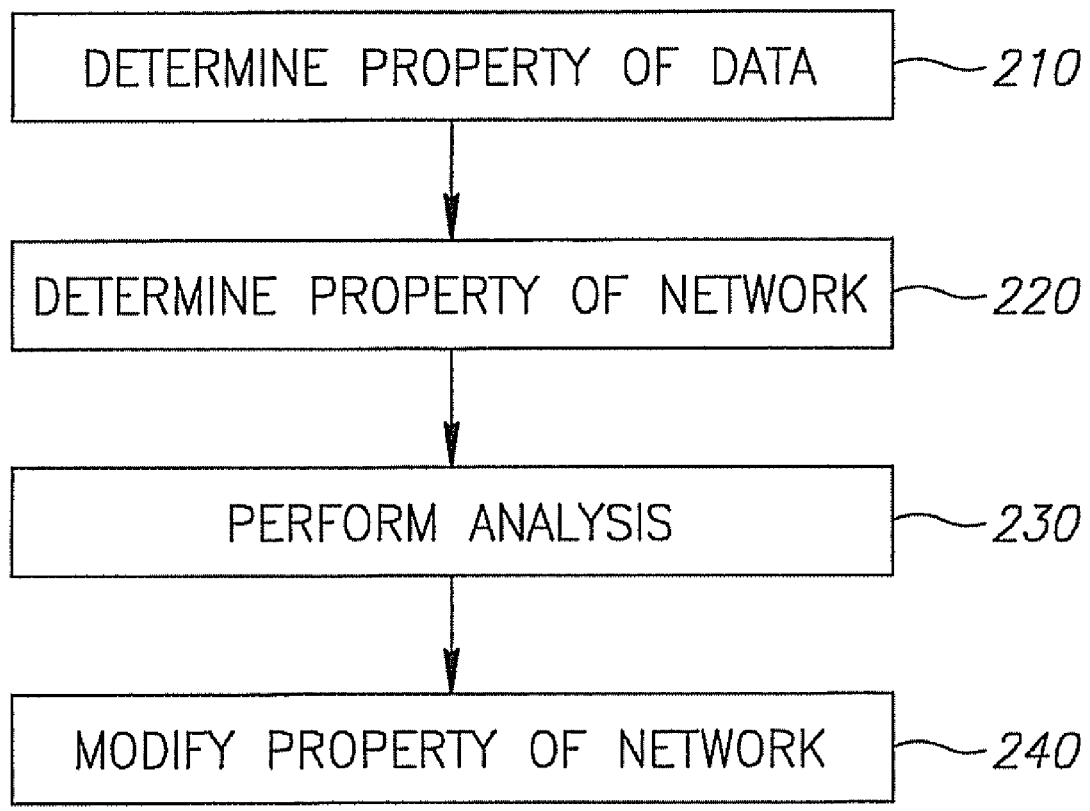
FIG. 2 is a flow chart diagram of a method of data transfer optimization in accordance with an embodiment of the invention.

FIG. 2 is a flow chart diagram of a method of data transfer optimization in accordance with an embodiment of the invention. The method of FIG. 2 may be used, for example, in conjunction with network 100 of FIG. 1. For example, in some embodiments, the method of FIG. 2 may be performed using station 110, computer 140, processor 141, and/or modem 146. In alternate embodiments, the method of FIG. 2 may be performed, for example, using server 120 and/or link 130, or using other suitable apparatuses and/or systems. It is noted that the method of FIG. 2 may be used in conjunction with various other suitable devices, systems, networks, applications and/or apparatuses.

It should be appreciated that the method of FIG. 2, and/or other methods in accordance with embodiments of the invention, may be used, for example, dynamically, repeatedly and/or selectively. These methods may be used, for example, during an initial network registration process or when a new connection or service flow is set in a network (e.g., between a CM and a CMTS). Additionally or alternatively, these methods may be used, for example, in real-time data communication, during an actual data transfer process, and/or immediately or substantially immediately before data transfer.

In accordance with some embodiments of the invention, as indicated at block 210, one or more properties or characteristics of a data item may be determined. This may be performed, for example, dynamically, repeatedly and/or selectively. For example, in one embodiment, the size of a data item that needs to be transferred from station 110 to server 120, or from server 120 to station 110, may be determined, measured, retrieved and/or calculated. The size of the data items may be measured, stored, represented and/or determined, for example, in bytes, in kilobytes, in packets, in frames, and/or in other suitable units. In some embodiments, more than one property or characteristic of the data item may be determined. In some embodiments, a data item may include, for example, one or more packets, frames, files, or other suitable data units. For example, in one embodiment, a data item may include one or more Internet web-pages that are about to be transferred or that need to be sent, one or more electronic mail messages and/or attached files that are about to be transferred or that need to be sent, one or more files (e.g., one or more HyperText Markup Language (HTML) files, word processing files, image files, program files, executable files, data files, Joint Photographic Experts Group (JPEG) files, Graphics Interchange Format (GIF) files, or other files) that are about to be transferred or that need to be sent, or other suitable data or datum that are about to be transferred or that need to be sent.

As indicated at block 220, one or more properties of network 100 may be determined. This may be performed, for example, dynamically, repeatedly and/or selectively. In one embodiment, for example, a property or characteristic of station 110, server 120, and/or link 130 may be determined, measured, calculated, stored and/or retrieved. In some embodiments, the property or characteristic may include, for example, a property or characteristic of one or more hardware components and/or software components of network 100 and/or of a component of network 100. The property or characteristic of network 100 may also be, for example, a property of a current communication session or the general communications properties of network 100, such as protocols, protocol settings, standards, etc. For example, the property or characteristic may include the data transfer window size of the software (e.g., of an operating system) of the sending device (e.g., station 110 or server 120). The size may be measured, represented and/or determined, for example, in bytes, in kilobytes, in packets, in frames, and/or in other suitable units. In one embodiment, the determination may include, for example, one or more queries to a software component (e.g., an operating system) of a sending device. In some embodiments, more than one property or characteristic of network 100 may be determined.

In some embodiments, the determined property or characteristic may optionally be stored, saved and/or written, for example, to a memory unit or a storage unit (e.g., memory unit 142, storage unit 143, memory unit 192, storage unit 193, or other suitable unit). This may allow, for example, in multiple iterations of the method of FIG. 2, further retrieval and/or usage of the determined property or characteristic without repeating the determination operation of block 220; determining may also involve retrieving values from storage device, database, table, etc. In alternate embodiments, further iterations of the method of FIG. 2 may repeat the determination operation of block 220, and the determined property or characteristic need not be stored.

As indicated at block 230, an analysis may be performed. This may be performed, for example, dynamically, repeatedly and/or selectively. In some embodiments, the analysis may take into account, for example, one or more properties or characteristics of the data item which were determined at block 210, and/or one or more properties or characteristics of network 100 which were determined at block 220 or otherwise retrieved (e.g., if stored upon their determination). In some embodiments, for example, the analysis may include comparing one or more values of one or more properties of the data item, to one or more values of one or more corresponding properties of network 100. For example, in one embodiment, the analysis may include comparing the size of a data item that needs to be transferred by station 110 or by server 120, or the size of the data item when actually sent (since transmission protocols may increase the size of the data item) to the data transfer window size of the sending or transferring device. The analysis may include other suitable comparisons, computations, calculations, determinations, estimations, and/or suitable operations.

In some embodiments, the analysis may include, for example, analysis of one or more properties or characteristics of a data item that was transferred, a data item being transferred, and/or a data item which needs to be transferred. The analysis may include, for example, an analysis of data traffic on network 100 and/or via one or more components of network 100. In some embodiments, the analysis may include, for example, a determination whether a PHS rule and/or a PHS module needs to be set, reset, canceled, deleted, replaced and/or modified. In one embodiment, the analysis may include, for example, a determination whether a PHS rule and/or PHS module is efficient, suitable and/or appropriate, or if a more efficient, suitable and/or appropriate PHS rule and/or PHS module may be used and/or set.

In one embodiment, the analysis may include, for example, a determination as to whether it may be beneficial and/or efficient to update, set, cancel and/or modify a PHS rule and/or PHS module, used in network 100 and/or by one or more components of network 100. The determination may include, for example, determining whether an amount of data traffic that may be saved by modifying the PHS rule and/or PHS module, is greater than an overhead or a "cost" (e.g., bandwidth overhead, setup overhead, performance overhead, processing overhead, or the like) associated with setting and/or modifying the PHS rule and/or PHS module, or is greater than, smaller than or equal to another threshold value. For example, in one embodiment, it may be determined that the PHS rule and/or PHS module may be modified if the amount of data or the data item that needs to be transferred is greater than 75 kilobytes, or another suitable limit or threshold value. Such a decision may be made, for example, if there exists in a protocol, a standard, an operating system or a network a set size for a data block, and a data item when transmitted may fit in a reduced number of such data blocks, if the transmission protocol or other parameters of the network are altered. In one embodiment, for example, it may be determined that a size of a data item that is about to be sent, or the ultimate transmission size of a data item to be sent (for example, after adding additional information, data, headers, packets etc. possibly required by transmission protocols), is greater than 75 kilobytes, or another suitable threshold value or data transfer window size. Other suitable values, amounts, conditions, parameters, attributes, properties, characteristics, threshold values and/or criteria may be used in accordance with embodiments of the invention, and other methods of determining if a change in parameters or rules should be made may be used.

In some embodiments, the PHS rule and/or PHS module may be effected or implemented using, for example, station 110, computer 140, processor 141, memory unit 142, storage unit 143, modem 146, software 148, server 150, computer 190, processor 191, memory unit 192, storage unit 193, modem 196, and/or software 198. In some embodiments, for example, station 110 may be or may include a CM, which may perform the determination operations of blocks 210 and 220, and/or the analysis operation of block 230. In alternate embodiments, other suitable components of network 100 (e.g., server 120, a component of server 120, or link 130) may perform some or all of these operations.

As indicated at block 240, optionally, one or more properties or characteristics of network 100 may be set and/or modified. This may be performed, for example, dynamically, repeatedly and/or selectively. In some embodiments, one or more properties or characteristics of one or more hardware components and/or software components of network 100, or of components of network 100, may be set and/or modified. For example, in some embodiments, one or more properties or characteristics of station 110, server 120 and/or link 130 may be set and/or modified.

In some embodiments, the setting and/or modification may be performed, for example, in relation to the results of the analysis of block 230. In accordance with some embodiments, for example, a property or characteristic of network 100, station 110, server 120 and/or link 130, may be set, reset, canceled, deleted, replaced and/or modified. For example, a dynamic PHS rule and/or PHS module in network 100, station 110, server 120 and/or link 130, may be set, reset, canceled, deleted, replaced and/or modified; in one embodiment, this may be performed, for example, in relation to the analysis results, dynamically, repeatedly and/or selectively. In some embodiments, for example, a property or characteristic of network 100, station 110, server 120 and/or link 130, may be set, reset, canceled, deleted, replaced and/or modified, if the size of a data item that needs to be transferred by station 110 or by server 120 is greater than the data transfer window size of the sending or transferring device.

In some embodiments, for example, a dynamic PHS rule and/or PHS module may be set, reset, canceled, deleted, replaced and/or modified, if the size of a data item that needs to be transferred, or the ultimate transmission length of the data item when data, headers, etc. may be added when the data item is transmitted, by station 110 or by server 120, is greater than the data transfer window size of the sending or transferring device. For example, if the size of a data item that needs to be transferred (or the ultimate transmission length of the data item when data, headers, etc. are added) is 80 kilobytes, and the data transfer window size of the sending or transferring device is 75 kilobytes, than a dynamic PHS rule and/or PHS module may be set, reset, canceled, deleted, replaced and/or modified, for example, to indicate that a repetitive, unchanging, recurring and/or static portion of a data (e.g., of a data packet, an acknowledgement packet, a header, etc.) may be suppressed, deleted, not sent, not transferred, or otherwise omitted. Other suitable sizes, values, parameters, attributes, properties, characteristics, threshold values, conditions and/or criteria may be used. In one embodiment, for example, one or more properties, parameters, characteristics, attributes, values, rules and/or modules, of network 100 or of a component of network 100 (e.g., of station 110, server 120, or link 130), may be set or modified, for example, to indicate that a repetitive, unchanging, recurring and/or static portion of a data item (e.g., of a data packet, an acknowledgement packet, a header, etc.) may be suppressed, deleted, not sent, not transferred, or otherwise omitted. Other suitable criteria, properties, attributes, characteristics, threshold values, conditions and/or analysis may be used in accordance with embodiments of the invention.

In some embodiments, setting and/or modifying a dynamic PHS rule and/or PHS module, or modifying a property or characteristic of a communication network (e.g., of network 100), may include, for example, transferring, sending, receiving, producing, processing, analyzing, and/or executing one or more commands, instructions, signals and/or messages indicating a need and/or a request to set and/or modify a dynamic PHS rule, a PHS module, or other suitable property, parameter, module, rule and/or attribute. For example, a message indicating and/or requesting a "dynamic service change" may be sent by station 110 to server 120 (or vice versa), to allow setting a new PHS rule and/or module between station 110 and server 120. In some embodiments, setting and/or modifying a dynamic PHS rule and/or PHS module may include, for example, setting and/or modifying a dynamic PHS rule and/or PHS module in one or more components of network 100, in series, in parallel, or substantially in parallel. This may be performed, for example, by station 110, server 120, link 130, or other suitable component of network 100.

In accordance with embodiments of the invention, a dynamic PHS rule and/or PHS module may include, for example, one or more rules or instructions for identifying, recognizing, determining, indicating, suppressing, deleting and/or omitting one or more portions of a data packet which may be repetitive, static, unchanging and/or suppressed. For example, in one embodiment, one or more repetitive, static and/or unchanging portions of a header or an acknowledgement message (e.g., of an ACK packet or an ACK message), may be suppressed, omitted, deleted, indicated, or not transferred. In one embodiment, a dynamic PHS rule and/or PHS module may, for example, allow transfer of all or substantially all of a data item except data packets, or portions of data packets, which content may be repetitive, static and/or unchanging. In some embodiments, a dynamic PHS rule and/or PHS module may, for example, allow transfer of only a variable, dynamic, non-static and/or changing portion of a data packet or a header.

In some embodiments, in accordance with a dynamic PHS rule, a portion of data or a data item may be suppressed. In one embodiment, for example, the sending device may suppress a repetitive and/or static portion of data or a data item, and the receiving device may restore the suppressed, static and/or repetitive portion. In some embodiments, for example, when station 110 sends a data item upstream and/or uploads a data item to server 120, station 110 may suppress a portion of the data item and server 120 may restore the suppressed potion of the data item. For example, station 110 may suppress or may cause the suppression of a portion of the data item, and may send to server 120 an indication that a portion of the data item was suppressed; server 120 may restore the suppressed portion, for example, using or based on the indication. Similarly, when server 120 sends a data item downstream to station 110, or when station 110 downloads a data item from server 120, server 120 may suppress a portion of the data item and station 110 may restore the suppressed potion of the data item. For example, server 120 may suppress a portion of the data item, and may send to station 110 an indication that a portion of the data item was suppressed; server 110 may restore the suppressed portion, for example, using or based on the indication.

In some embodiments, the sending device may send an indication that a portion of the data item is was suppressed, and the receiving device may, for example, restore, rebuild, re-generate or reconstruct the suppressed portion of the data item, using or based on the indication. In some embodiments, the receiving device may, for example, receive the indication from the sending device. The indication may include, for example, one or more packets or frames, one or more portions of a packet or a frame, one or more headers or portions of a header, or one or more bits, bytes, sets of bytes, strings, attributes, parameters, signals, messages, and/or other suitable "flags" of indication. The indication may include, for example, one or more indications that one or more portions of the data items were suppressed, and/or one or more indications of the data that was suppressed. In some embodiments, the indication may be sent to indicate that a portion of the data item was suppressed and needs to be restored by the receiving device. In other embodiments, the indication may be optional, and the receiving device may detect that a portion of a received data item needs to be restored (e.g., by detecting that a received data item does not contain some or all data packets, headers, acknowledgment packets, etc.) and may restore the suppressed portion. Other types of indications may be sent, received and/or used in accordance with embodiments of the invention.

Station 110, server 120, or other units, components and/or devices may send, transfer, receive, download and/or upload data or data items in accordance with embodiments of the invention. In one embodiment, for example, station 110 may modify (possibly dynamically) a property of a data item that is being sent. Such modification may be, for example, in relation to an analysis, for example, of a header and/or a content of said data item. For example, one or more data packets, headers, frames and/or content of a data item may be modified and/or suppressed in a data item before the data item is sent out; other data in a data item may be added, deleted, suppressed and/or modified.

In one embodiment, network 100 may operate, for example, in accordance with Transmission Control Protocol/Internet Protocol (TCP/IP), HyperText Transfer Protocol (HTTP), File Transfer Protocol (FTP), Simple Mail Transfer Protocol (SMTP), and/or other suitable protocols and/or standards. A receiving device may generate an acknowledgement packet (ACK). This may be performed, for example, periodically e.g., every two or three received packets, or every three kilobytes of received data. In some embodiments, an ACK packet may include, for example, a header and a packet payload. The header may contain static, unchanging, and/or repetitive data, which may be repeated verbatim in two or more consecutive ACK packets. The packet payload portion may contain variable, changing, non-repetitive and/or non-static data. In one embodiment, a header or another unvarying portion of an ACK packet may be suppressed, omitted, indicated, deleted, not sent or not transferred, and a packet payload of an ACK packet may be sent or transferred. In accordance with embodiments of the invention, other portions of an ACK packet, or of other data packets, may be sent, transferred, suppressed, omitted, deleted, indicated, not sent, or not transferred, for example, to achieve various functionalities and/or benefits. Other formats for acknowledgement or ACK packets or data structures may be used.

It is noted that various other operations and/or methods may be used in accordance with embodiments of the invention. For example, a method may include dynamically setting and/or modifying one or more properties, parameters, attributes, rules, PHS rules, modules, and/or PHS modules, based on or in relation to an analysis of one or more data items, packets, files, headers, and/or related content of one or more communication messages. Methods and/or operations in accordance with embodiments of the invention may be performed, for example, dynamically, repeatedly and/or selectively. Other suitable operations and/or methods may be used.

Using embodiments of the invention may allow various benefits. Some embodiments may, for example, increase data transfer rate, communication efficiency, bandwidth, actual bandwidth, throughput, actual throughput, performance, and/or performance speed. Some embodiments may, for example, allow an enhanced user experience and shorter time delays when data is transferred, sent, received, downloaded and/or uploaded. It is noted that some embodiments of the invention may allow various other benefits, in addition to or instead of the benefits described.

Some embodiments of the invention may be implemented, for example, using a machine-readable medium or article which may store an instruction or a set of instructions that, if executed by a machine (for example, by station 110, by processor 141, by server 120, by processor 191, and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 142 or memory unit 192), memory device, memory article, memory medium, storage device, storage article, storage unit (e.g., storage unit 143 or storage unit 193) and/or storage medium, e.g., memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors, or devices as are known in the art. Some embodiments of the invention may include buffers, registers, storage units and/or memory units, for temporary or long-term storage of data or in order to facilitate the operation of a specific embodiment.

While certain features of the invention have been illustrated and described herein, many modifications, substitutions, changes, and/or equivalents may occur to those skilled in the art. It is, therefore, to be understood that the appended claims are intended to cover all such modifications and/or changes.

What is claimed is:

1. A method comprising:
   determining a size of a data item to be transferred in a communication network;
   determining a data transfer window size of a sending device in the communication network; and
   dynamically modifying a payload header suppression rule if an amount of data traffic saved by modifying the payload header suppression rule is greater than a threshold;
   wherein determining the size, determining the data transfer window size and dynamically modifying the payload header suppression rule are performed by a component of the network.

2. The method of claim 1, wherein dynamically modifying a payload header suppression rule causes dynamically suppressing a static portion of a data packet.

3. The method of claim 2, wherein dynamically modifying a payload header suppression rule causes restoring the suppressed static portion of said data packet.

4. The method of claim 2, comprising sending an indication that a portion of the data packet is suppressed.

5. The method of claim 2, wherein the data packet is an acknowledgement packet.

6. The method of claim 1, comprising dynamically modifying a characteristic of the data item in relation to an analysis of a header and a content of said data item, wherein dynamically modifying a characteristic of the data item is performed by a component of the network.

7. The method of claim 1, comprising repeating the determining the size of a data item, determining the data transfer window size, and the dynamically modifying the payload header suppression rule.

8. An apparatus comprising:
   a memory to store instructions that, when executed by a processor, determine a size of a data item to be transmitted over a communication network, to determine a data transfer window size of a sending device in the communication network, and to dynamically modify a payload header suppression rule if an amount of data traffic that may be saved by modifying the payload header suppression rule is greater than a threshold; and
   a processor to execute the instructions stored in the memory.

9. The apparatus of claim 8, wherein the processor is to change a payload header suppression rule to cause suppressing a static portion of a data packet.

10. The apparatus of claim 9, wherein the processor is to change a payload header suppression rule to cause rebuilding the suppressed static portion of said data packet.

11. The apparatus of claim 9, wherein the data packet is an acknowledgement packet.

12. The apparatus of claim 8, wherein the apparatus comprises a modem.

13. A modem comprising:
   a dynamic random access memory to store instructions that, when executed by a processor, dynamically determine a size of a data item to be transmitted over a communication network, to determine a data transfer window size of a sending device in the communication network, and to dynamically modify a payload header suppression rule if an amount of data traffic saved by modifying the payload header suppression rule is greater than a threshold; and
   a processor to execute the instructions stored in the dynamic random access memory.

14. The modem of claim 13, wherein the processor is to change a payload header suppression rule to cause suppressing a static portion of a data packet.

15. The modem of claim 14, wherein the processor is to change a payload header suppression rule to cause rebuilding the suppressed static portion of said data packet.

16. The modem of claim 13, wherein the processor is to repeatedly execute the instructions stored in the dynamic random access memory.

17. A non-transitory machine-readable medium having stored thereon a set of instructions that, when executed by a machine, cause the machine to perform a method comprising:
   determining a size of a data item to be transmitted in a communications network; and
   modifying a payload header suppression rule to selectively suppress a portion of a header of a packet if an amount of data traffic saved by modifying the payload header suppression rule is greater than a threshold.

18. The non-transitory machine-readable medium of claim 17, wherein the portion of the header is a portion of an acknowledgement packet.

19. The non-transitory machine readable medium of claim 17, wherein modifying the payload header suppression rule causes suppressing a static portion of a data packet.

20. The non-transitory machine readable medium of claim 19, wherein modifying the payload header suppression rule causes rebuilding the suppressed static portion of said data packet.

* * * * *